United States Patent Office 3,575,806
Patented Apr. 20, 1971

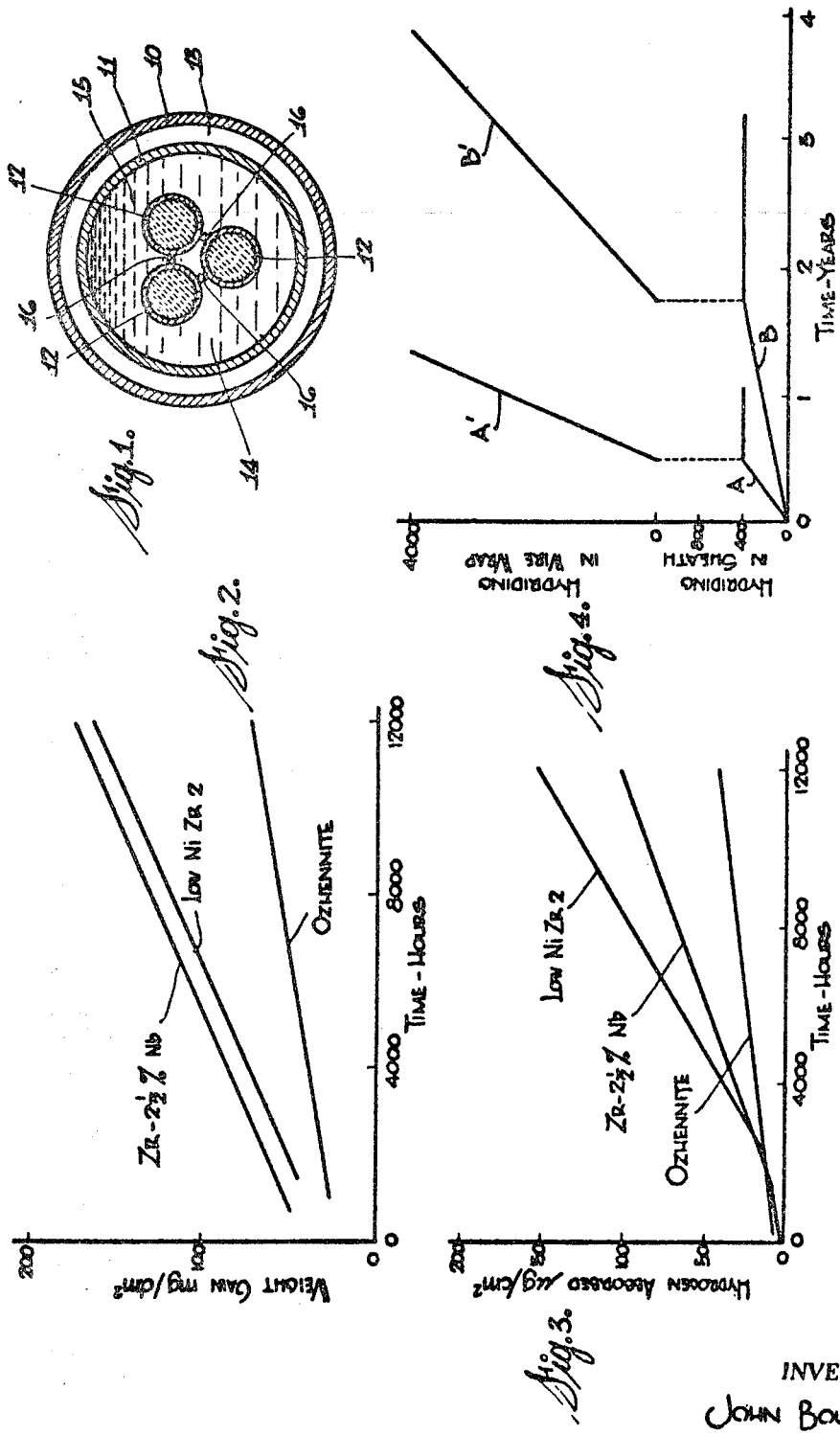

3,575,806
HYDRIDING RESISTANT ZIRCONIUM ALLOY COMPONENTS
John Boulton, Pinawa, Manitoba, Canada, assignor to Atomic Energy of Canada Limited, Ottawa, Ontario, Canada
Filed Nov. 24, 1967, Ser. No. 685,534
Int. Cl. G21c *15/00, 19/28*
U.S. Cl. 176—50    3 Claims

ABSTRACT OF THE DISCLOSURE

Nuclear reactor components in an organic coolant circuit formed from a zirconium alloy containing 0.1 to 0.3% Sn, 0.05 to 0.2% Fe, 0.05 to 0.2% Ni, 0.05 to 0.2% Nb by weight with the remainder zirconium, which alloy exhibits a high resistance to hydriding when exposed to a hydriding atmosphere such as provided by organic coolant.

BACKGROUND OF THE INVENTION

This invention relates to nuclear reactor components in a hydriding environment.

Such a hydriding environment occurs in the type of nuclear reactor using organic coolant which is presently in use. Known types of organic coolants include Santowax OM, which is a brand name of the Monsanto Company denoting a mixture of terphenyls. Santowax OM has a freezing point of 38° C. and below that temperature is a yellow crystalline solid, soluble in benzene, acetone and ethanol but insoluble in water. A further type of organic coolant is denoted as HB–40, also a brand name of the Monsanto Company. HB–40 consists of a mixture of partially hydrogenated terphenyls. Both these organic coolants produce hydrogen by thermal decomposition, HB–40 having a higher rate of hydrogen production than Santowax OM, and the presence of this hydrogen together with the absence of any oxidizing potential provides the hydriding environment. In this specification the phrase "organic coolant" is used to denote such coolants as Santowax OM, HB–40 and their chemical equivalents.

A preferred material for use in nuclear reactors is zirconium which has a low value of neutron capture cross-section. Zirconium alloy components have adequate strength and ductility for use at temperatures in the vicinity of 500° C. Zirconium, however, has an affinity for hydrogen and the absorption and consequent precipitation of zirconium hydride in a zirconium alloy component has a deleterious effect on the mechanical properties of the component and may, in time, lead to serious embrittlement if the absorption of hydrogen is not controlled. Clearly, this limitation in the useful life of the component is undesirable.

Various solutions to the problems posed by excessive absorption of hydrogen during the use of zirconium alloy components in organic coolants have been suggested. For example, in copending United States application Ser. No. 594,742, filed Nov. 16, 1966 by Sawatzky there is disclosed the use of sacrificial members of zirconium alloy bonded to the component to be protected. These sacrificial members selectively absorb hydrogen, due to their lower temperature, thereby avoiding the precipitation of zirconium hydride in the component. An alternative approach to the problem is disclosed in copending United States application Ser. No. 484,594 filed Sept. 2, 1965 by Hatcher and Boulton which teaches that the hydriding of zirconium alloys exposed to organic coolant can be significantly reduced by maintaining a certain minimum concentration of water in the organic coolant and maintaining the chlorine concentration as low as possible.

SUMMARY OF THE INVENTION

This invention comprises the use of nuclear reactor components formed from the zirconium alloy hereinafter defined in combination with a hydriding environment such as that formed by organic coolant.

BRIEF DESCRIPTION OF THE DRAWING

FIG. 1 is a cross-sectional view of a zirconium alloy fuel element contained in a zirconium alloy pressure tube which is, in turn, contained within a reactor calandria tube, FIG. 2 is a graph showing the corrosion rate of various zirconium alloys in organic coolant, FIG. 3 is a graph showing the hydriding rate of various zirconium alloys in organic coolant, and FIG. 4 is a graph showing the estimated life of reactor components made from two different zirconium alloys.

DESCRIPTION OF THE PREFERRED EMBODIMENT

FIG. 1 shows a typical arrangement of components in a nuclear reactor employing organic coolant. A zirconium alloy pressure tube 11 is positioned inside a reactor calandria tube 10 preferably suitably formed from aluminum. The space 13 between pressure tube 11 and calandria tube 10 contains carbon dioxide to act as an insulant and the volume outside the calandria tube 10 is occupied by heavy water moderator typically at a temperature of 80° C. Removable fuel elements, having sheathing indicated schematically at 12, are contained in the interior 14 of the pressure tube through which flows organic coolant indicated at 15. The organic coolant is typically at a temperature around 350° C. and a pressure around 200 p.s.i.g. The fuel elements each have a length of zirconium alloy wire 16 bonded to their exterior and this wire, being at a lower temperature than the fuel element during operation, acts as a hydrogen sink in the manner set out in the above-identified application Ser. No. 594,742.

In accordance with the teachings of this invention the pressure tube 11 and the fuel element sheathing 12 are formed from the zirconium alloy of the type known as Ozhennite. The composition of this alloy is from about 0.1 to 0.3% Sn, 0.05 to 0.2% Fe, 0.05 to 0.2% Ni and 0.05 to 0.2% Nb, by weight, with the remainder zirconium. A preferred form for use is known as Ozhennite 0.5 containing 0.2% Sn, 0.1% Fe, 0.1% Ni, 0.1% Nb, by weight, with the remainder zirconium. The use of such alloys in the fabrication of components 11 and 12 results in a significantly increased life of such components, when exposed to a hydriding environment, compared with the life of previously used components.

Of the zirconium alloys hitherto available and commonly used in nuclear reactors having organic coolants, Zr–2½% Nb has exhibited the lowest rate of hydrogen absorption. Another useful known material is low Ni Zircaloy–2 which has, however, a greater rate of hydrogen absorption than Zr–2½% Nb. The advance over such known alloys achieved by the present invention is illustrated by the following example.

EXAMPLE

Zirconium alloys were tested in organic coolant, HB–40 under the following conditions:

Temperature—400° C.
Pressure—540 p.s.i.
Water content—80–150 p.p.m.
Chlorine—<0.5 p.p.m.
Dissolved hydrogen—60–150 cc./kg.

The following table gives the measured values of corrosion rate and hydriding rate for different zirconium alloys:

TABLE

| Alloy | Duration, days | Corrosion rate, mg. dm.$^{-2}$ day$^{-1}$ | Hydriding rate, mg. dm.$^{-2}$ day$^{-1}$ |
| --- | --- | --- | --- |
| Low Ni Zircaloy-2 | 490 | 0.28 | 0.035 |
| Zr-2.5% Nb | 490 | 0.27 | 0.022 |
| Ozhennite 0.5 | 440 | 0.10 | 0.007 |

Other measurements giving total corrosion and hydrogen absorption for varying durations of exposure are shown in FIGS. 2 and 3 (where the alloy is Ozhennite 0.5 and the temperature of measurement 400° C.). Thus, it will be seen, that Ozhennite-type alloys exhibit significantly lower hydriding and corrosion rates in organic coolant than previously used zirconium alloys.

As an indication of the useful life to be expected from components formed from different zirconium alloys and exposed to a hydriding atmosphere consider fuel sheathing as shown at 12 having a bonded wire 16 acting as a sacrificial member. In the case of sheathing of thickness 0.074 cms. formed from Zr-2½% Nb exposed to coolant at 465° C. the useful life is estimated as being 1.3 years. This estimate presumes that hydrogen in the sheathing 12 in excess of terminal solid solubility (about 350 p.p.m. at 465° C.) will diffuse to the wire 16 and a limit of 4000 p.p.m. in the wire establishes the limit of useful life. The ratio of sheath volume to wire volume is taken as 10:1. This situation is illustrated in FIG. 4 in which curve A represents the hydrogen absorbed in the sheathing and curve A' represents the hydrogen absorbed in the wire 16.

For fuel sheathing of identical dimensions formed from Ozhennite-type alloys and exposed to organic coolant under the same conditions the estimated useful life is four years. Again referring to FIG. 4, curve B represents the hydriding in the sheathing and curve B' represents the hydrogen absorption in the wire 16 with the limit of 4000 p.p.m. in the wire being reached in four years. The hydriding rate in Ozhennite-type alloys has proven to be sufficiently low that for a duration of exposure to organic coolant of up to two years the wire 16 serving as a hydrogen sink may be discarded with resulting neutron economy.

The resulting improvement in useful life of components formed from Ozhennite-type alloys may also be illustrated by considering pressure tubes such as shown at 11 in FIG. 1. Assuming a pressure tube having a wall thickness of 0.36 cm. operating in organic coolant at a temperature of 400° C. the following table compares the expected lives of such a component when formed from Ozhennite-type alloys and when formed from Zr-2½% Nb assuming the terminal solid solubility (T.S.S.) of hydrogen in each alloy is 195 p.p.m.

TABLE

| | Ozhennite 0.5 | Zr-2½% Nb |
| --- | --- | --- |
| Hydriding rate | 11.2 p.p.m./year | 35 p.p.m./year |
| Time to reach T.S.S. | 17.4 years | 5.6 years |
| Time to reach 500 p.p.m., H$_2$ | 44.6 years | 14.3 years |

Thus, the advantage, in terms of useful life, of Ozhennite-type alloys over the previously used zirconium alloys will be clear. If it is assumed that absorption of hydrogen equal to the terminal solid solubility is the limit of useful life then the estimated life of 17 years for an Ozhennite-type alloy pressure tube is over half the usually accepted life of a power reactor. The time to reach a hydrogen absorption of 500 p.p.m. is also included in the table since it appears at present that some degree of hydrogen absorption beyond terminal solid solubility may be tolerated.

Thus there has been described the unexpected advantages obtained when a hydriding environment is contained in Ozhennite-type zirconium alloys.

I claim:

1. In a nuclear reactor, an organic coolant circuit forming a hydriding environment and zirconium alloy coolant channels and fuel cladding exposed to said hydriding environment, the improvement comprising said channels and cladding being formed from an alloy containing 0.1 to 0.3% Sn, 0.05 to 0.2% Fe, 0.05 to 0.2% Ni, 0.05 to 0.2% Nb, by weight, with the remainder zirconium.

2. The combination set out in claim 1 in which the zirconium alloy contains 0.2% Sn, 0.1% Fe, 0.1% Ni, 0.1% Nb, by weight, with the remainder zirconium.

3. The combination set out in claim 1 in which the coolant channels comprise a pressure tube and the fuel cladding comprises fuel sheathing, said pressure tube and fuel sheathing being formed from said zirconium alloy.

References Cited

UNITED STATES PATENTS

| | | | |
| --- | --- | --- | --- |
| 3,121,034 | 2/1964 | Anderko et al. | 75—177X |
| 3,148,055 | 9/1964 | Kass et al. | 75—177 |
| 3,150,972 | 9/1964 | Rosler et al. | 75—177 |
| 3,271,205 | 9/1966 | Winton et al. | 176—91X |
| 3,287,111 | 11/1966 | Klepfer | 176—91X |
| 3,294,594 | 12/1966 | Bertea et al. | 75—177X |
| 3,331,748 | 7/1967 | Feraday | 176—91X |
| 3,341,373 | 9/1967 | Evanas et al. | 75—177X |
| 3,354,043 | 11/1967 | Boettcher | 176—91X |

BENJAMIN R. PADGETT, Primary Examiner

M. J. SCOLNICK, Assistant Examiner

U.S. Cl. X.R.

75—177; 176—67, 91, 92